July 24, 1956 R. F. E. STEGEMAN 2,755,705
SEMI-RIMLESS SPECTACLE
Filed May 5, 1951

INVENTOR.
R.F.E. STEGEMAN
BY
*[signature]*
ATTORNEY

United States Patent Office 2,755,705
Patented July 24, 1956

2,755,705

SEMI-RIMLESS SPECTACLE

Raymond F. E. Stegeman, Greece, N. Y., assignor to Bausch & Lomb Optical Company, Rochester, N. Y., a corporation of New York Application May 5, 1951, Serial No. 224,699

2 Claims. (Cl. 88—47)

This invention relates to spectacles and more particularly it has reference to spectacles of the semi-rimless type.

One of the objects of my invention is to provide an improved semi-rimless spectacle. Another object is to provide a spectacle in which the lenses are held by semi-rims so mounted that strains from the temples are not transmitted to the lenses. A further object is to provide an improved semi-rimless spectacle which is constructed of metallic and non-metallic materials. These and other objects and advantages reside in certain novel features of construction, arrangement and combination of parts as will hereinafter be more fully described and pointed out in the appended claims.

Referring to the drawings.

Figure 1:
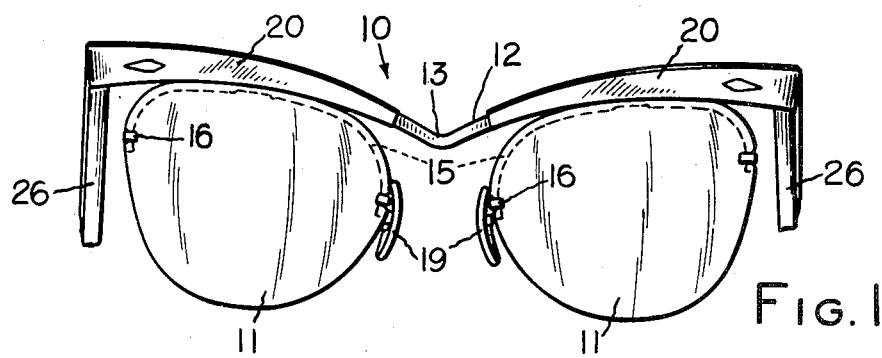
Fig. 1 is a front view of a spectacle embodying my invention, with the temples broken away.
Figure 2:
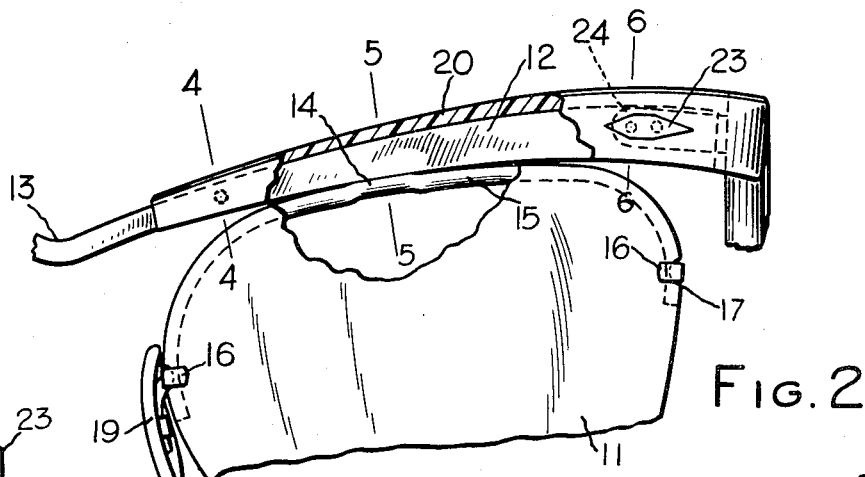
Fig. 2 is an enlarged fragmentary view of the spectacle with parts shown in section.
Figure 6:
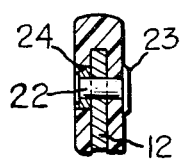
Figure 3:
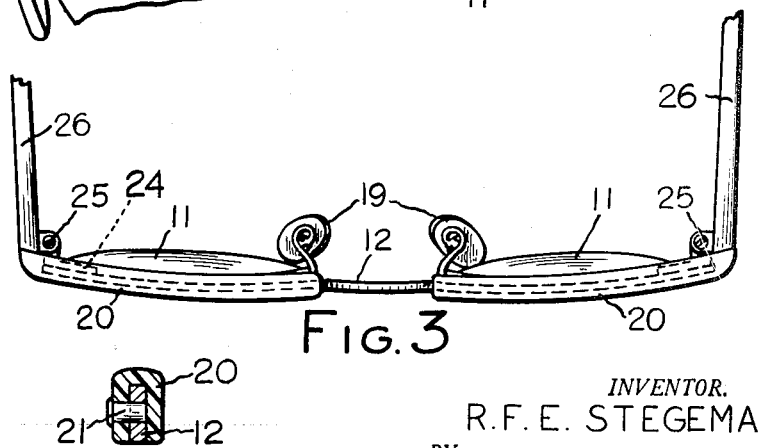
Fig. 3 is a top plan view of the device shown in Fig. 1.
Figures 4, 5:
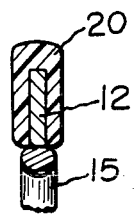

Figs. 4, 5 and 6 show sections taken, respectively on lines 4—4, 5—5 and 6—6 of Fig. 1.

A preferred embodiment of my invention is shown in the drawings wherein 10 indicates a semi-rimless spectacle embodying the spaced lenses 11. Positioned above the lenses and extending beyond the temporal edges thereof is the metallic bar 12 which has its middle portion depressed as at 13. Depending from the underside of the bar and soldered thereto at their central portions 14 are the resilient, metallic rim members 15 which are located rearwardly of the lenses and extend along the nasal, upper and temporal edges of the lenses.

The nasal and temporal portions of the rim members 15 carry the forwardly extending brackets 16 which are resiliently engaged in notches 17 formed in the nasal and temporal edges of the lenses. The forward ends of brackets 16 are bent laterally so as to engage the front surfaces of the lenses. Nose engaging pads 19 are secured to the nasal portions of rim members 15.

Extending over the top edge of bar 12 and covering the front and rear surfaces thereof at portions above the lenses 11 are the inverted U-shaped non-metallic parts 20 which may be formed of plastic material. The parts 20 are secured to the metallic bar 12 by means of rivets 21 at the nasal portions of parts 20 and by rivets 22 which are located at the temporal portions of parts 20 and embody the front plates 23. The rivets 22 pass through the hinge plates 24 and thus provide means for attaching the hinges 25 for pivotally supporting temples 26.

With the foregoing structure, the strain caused by the pull of the temples is carried by the bar 12 and is not transmitted to the lenses. The lenses 11 are carried by the resilient rim members 15 which are attached to the bar 12 only at one place at their central portions. Hence, the lenses are suspended from the underside of the bar by resilient means so that strains caused by placing them on and removing them from the face of the wearer are not transmited to the lenses. Yet the lenses are firmly held at points located at the nasal and temporal edges thereof so that they are properly located in front of the eyes of the wearer. The non-metallic temples 26 are pivotally secured to the temporal ends of the non-metallic parts 20 so that a unitary structure is provided and the cosmetic effect is enhanced.

Various modifications can, obviously, be made without departing from the spirit of my invention as pointed out in the appended claims.

I claim:

1. A spectacle comprising a pair of spaced lenses, a metallic bar located above and extending between said lenses and beyond the temporal edges thereof, means for attaching the lenses to the bar comprising a pair of metallic rim members which carry the lenses, said rim members extending along the upper edges of the respective lenses, the central portion of each rim member being soldered to and depending from the underside of the bar, each portion of the bar which extends outwardly from the point of connection with its adjacent rim member being spaced above the edge of the adjacent lens whereby the temporal ends of the bar may be adjusted forwardly and rearwardly relatively to the lenses in planes which are substantially perpendicular to the planes of the lenses.

2. A spectacle comprising a pair of spaced lenses, supporting bar means located above and extending between said lenses and beyond the temporal edges thereof, means for attaching the lenses to the bar means comprising a pair of rim members which carry the lenses, said rim members extending along the upper edges of the respective lenses, the central portion of each rim member being connected to and depending from the underside of the bar means, each portion of the bar means which extends outwardly from the point of connection with the adjacent rim member being spaced above the edge of the adjacent lens and temples carried by the ends of the bar means whereby the temporal ends of the bar means may be adjusted rearwardly and forwardly of the lenses.

References Cited in the file of this patent

UNITED STATES PATENTS

| | | |
|---|---|---|
| 1,515,624 | Schumacher et al. | Nov. 18, 1924 |
| 2,129,458 | Ashley | Sept. 6, 1938 |
| 2,208,103 | Paterson | July 16, 1940 |
| 2,356,148 | Cozzens et al. | Aug. 22, 1944 |
| 2,373,650 | Brusell | Apr. 17, 1945 |
| 2,439,357 | Bouchard | Apr. 6, 1948 |
| 2,450,711 | Bouchard | Oct. 5, 1948 |
| 2,514,103 | Styll | July 4, 1950 |

FOREIGN PATENTS

| | | |
|---|---|---|
| 430,432 | Great Britain | June 19, 1935 |
| 615,272 | Great Britain | Jan. 4, 1949 |
| 623,706 | Great Britain | May 20, 1949 |
| 498,023 | Belgium | Mar. 9, 1951 |